(12) United States Patent
Roberts et al.

(10) Patent No.: US 7,565,535 B2
(45) Date of Patent: Jul. 21, 2009

(54) SYSTEMS AND METHODS FOR DEMONSTRATING AUTHENTICITY OF A VIRTUAL MACHINE USING A SECURITY IMAGE

(75) Inventors: Paul Cador Roberts, Kirkland, WA (US); Laura Posey Benofsky, Seattle, WA (US); William Gifford Holt, Bothell, WA (US); Leslie Helena Johnson, Renton, WA (US); Madeline Jinx Bryant, Kenmore, WA (US); Nicholas I. Nussbaum, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 792 days.

(21) Appl. No.: 11/123,779

(22) Filed: May 6, 2005

(65) Prior Publication Data

US 2006/0253706 A1    Nov. 9, 2006

(51) Int. Cl.
*H04L 9/00* (2006.01)
(52) U.S. Cl. .................................................. 713/168
(58) Field of Classification Search .................. None
See application file for complete search history.

(56) References Cited

U.S. PATENT DOCUMENTS

| | | | | |
|---|---|---|---|---|
| 5,822,435 A | * | 10/1998 | Boebert et al. ............. | 713/192 |
| 6,385,721 B1 | | 5/2002 | Puckette ..................... | 713/2 |
| 7,337,466 B2 | * | 2/2008 | Light et al. ................. | 726/2 |
| 2002/0023032 A1 | | 2/2002 | Pearson et al. ............. | 705/35 |
| 2002/0139351 A1 | | 10/2002 | Braun et al. ............... | 123/463 |
| 2002/0194482 A1 | | 12/2002 | Griffin et al. .............. | 713/176 |
| 2002/0194493 A1 | | 12/2002 | Dalton ....................... | 713/200 |

OTHER PUBLICATIONS

U.S. Appl. No. 10/691,759, filed Oct. 23, 2003, Avraham et al.
U.S. Appl. No. 10/693,061, filed Oct. 24, 2003, Avraham et al.
U.S. Appl. No. 10/693,407, filed Oct. 24, 2003, Roberts et al.

(Continued)

*Primary Examiner*—Kambiz Zand
*Assistant Examiner*—Aubrey H Wyszynski
(74) *Attorney, Agent, or Firm*—Woodcock Washburn LLP

(57) ABSTRACT

Access to an authentication image may be protected so that only authenticated processes have access to the image. The image can be displayed to authenticate a User Interface (UI) to a computer user. The image indicates the UI can be trusted. If the image is not displayed, it may be that an application UI is "spoofed" to trick a user into providing sensitive information. Additionally, a large variety of different images can be used as authentication images, so spoofing one image be recognized by most users. A set of original images may be provided, along with image modification processes which can generate a large number of variations. Techniques for authenticating UIs in a virtual machine context are provided. A secure attention sequence is also provided, which allows users to test whether processes running on a computer are authenticated.

20 Claims, 10 Drawing Sheets
(1 of 10 Drawing Sheet(s) Filed in Color)

OTHER PUBLICATIONS

U.S. Appl. No. 10/697,197, filed Oct. 30, 2003, Cohen.
U.S. Appl. No. 10/954,917, filed Sep. 30, 2004, Willman et al.
Brocker, L. et al., "Improving the retrieval performance of content-based image retrieval systems: the GIVBAC approach", *Proceedings Fifth International Conference on Information Visualisation*, Jul. 25-27, 2001, London, UK, 769.
Riegelsberger, J. et al., "Trustbuilders and trustbusters—the role of trust cues in interfaces to E-commerce applications", *Proceedings 1st IFIP Conference on e-Commerce, e-Business, e-Government*, Oct. 3-5, 2001, Zurich, Switzerland, 17-30.
Roy, M.C. et al., "The impact of interface usability on trust in Web retailers", *Internet Research-Electronic Networking Applications and Policy*, 2001, 11(5), 388-398.
Schunter, M. et al., "Architecture and design of a secure electronic marketplace", *Proceedings of JENC 8, 8th Joint European Networking Conference*, May 12-15, 1997, Edinburgh, UK, 712/1-5.

* cited by examiner

Exemplary Image Modification Process Outputs
Original Image 400
401
Hue Rotation 420
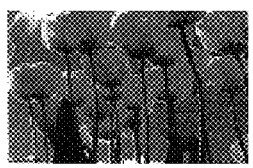
421
Negative 430
431
Alpha Blend 440
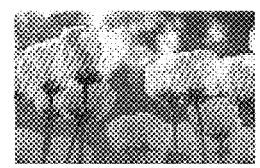
441
Shape overlay 450
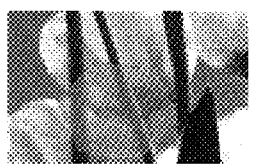
451
Screen overlay 460
460
Fig. 4
Character overlay 470
  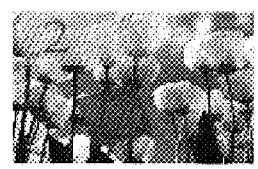 
471   472   473   474
Subsectioning 410
 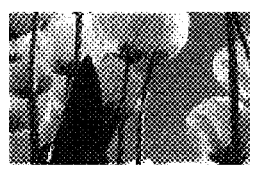 
411   412   413

SYSTEMS AND METHODS FOR DEMONSTRATING AUTHENTICITY OF A VIRTUAL MACHINE USING A SECURITY IMAGE

CROSS REFERENCE TO RELATED APPLICATIONS

This application is related to application entitled "Systems and Methods for Authenticating a User Interface," U.S. application Ser. No. 11/097,712, filed on Apr. 1, 2005, which is hereby incorporated by reference in its entirety, and to application entitled "Systems and Methods for Determining If Applications Executing On A Computer System Are Trusted", U.S. application Ser. No. 11/123,778, filed on even date herewith, which is hereby incorporated by reference in its entirety.

FIELD OF THE INVENTION

The present invention relates generally to the field of computer security. More particularly, the invention relates to prevention of "spoof" attacks in which a rogue computer process gains access to sensitive data by presenting itself as a legitimate process.

BACKGROUND OF THE INVENTION

A "spoof" attack occurs when a rogue process gains access to sensitive data by presenting itself as a legitimate process. For example, imagine a rogue process that spoofs a legitimate operating system logon process. Such a rogue process might present a User Interface (UI) on a computer's display that appears to be a legitimate user logon UI. The user may unwittingly enter their username and password. Once this sensitive data is obtained by a rogue process, much of the user's sensitive data may be vulnerable.

Various secure computing technologies in use today have not been adequately leveraged to address the spoof attack problem. A Hardware Security Module (HSM) has been used recently to help ensure trustworthiness of software that executes on a computer in some scenarios. The HSM is a processor that is typically affixed to a computer's motherboard. It can securely store a secret, for example, a password, that may be needed to access some computing resource. The secret is "sealed" by the HSM, and may only be released if correct information is provided to the HSM. A popular HSM in use today is the Trusted Processing Module (TPM), as developed and published by the TRUSTED COMPUTING GROUP® (TCG).

In an exemplary arrangement, one or more measurements may be submitted to a HSM, and the HSM determines if the measurements are what they should be. If they are, the HSM may release one or more secrets. This arrangement can be used to ensure the authenticity of a software component prior to allowing the component to execute. For example, a software component might first be measured by performing a hash over the component. The resulting measurement can be passed to a HSM. A secret can be sealed to the measurement, such that the secret is available only if the same measurement is submitted. Prior to allowing the component to execute, it can be measured to ensure that the component has not changed since the secret was sealed. The measurement can be submitted to the HSM. If the measurement is correct, the secret may be released, which allows the component to execute. If the submitted measurement is not correct, then the secret may not be released and the component may be prevented from executing.

While the use of a HSM, or other secure computing technologies, can authenticate a software component, note that a user may have no signal that a UI presented to them on a display was in fact authenticated. The possibility remains that a rogue process may completely bypass a HSM, and present a spoofed UI to a user. As public understanding of secure computing measures improves, new attacks are inevitably developed to bypass security features.

To this end, U.S. patent application Ser. No. 10/691,759 presents, among other developments, a technique for providing a computer user with proof that a UI he or she sees is authenticated. A text string, such as a name of a computer user's dog, "Fido," may be protected as a secret. If a component, process, or other data is authenticated, the string may be presented to the user in a corresponding UI. For example, when running MICROSOFT INTERNET EXPLORER® (IE), a user might see his dog's name in a portion of the UI, thereby indicating to the user that the IE application was properly authenticated.

The drawbacks of using a text string to authenticate a UI to a computer user are twofold. First, this technique may be vulnerable to "over the shoulder" attacks. An attacker who simply looks over the shoulder of a computer user with a UI which is protected in this manner may obtain the user's secret information, e.g., "Fido," and may design a spoof attack directed at that user. The attacker may design a rogue application that also displays "Fido" without first authenticating itself.

Second, text strings are notoriously overlooked by users. Studies show that users who see the first few characters of a word often do not notice when the remainder is misspelled. Users are presented with large amounts of text in an average workday, and simply may not bother to double-check the security string that demonstrates they are engaging with an authenticated UI. Thus, attacks that simply spoof a string may be successful in some percentage of cases.

Furthermore, the difficulties in demonstrating authenticity of computer processes are compounded in the context of virtual machine technologies. Virtual machines, in general, involve the simultaneous execution of two operating systems on a single computer system. A first operating system may have security features, such as those using the HSM as described above, while the other operating systems do not.

Numerous virtual machine configurations exist in the industry. A virtual machine monitor (VMM) can allow complete separation between two execution environments. Another configuration allows one operating system to act as a "host" for another operating system, a "guest". In this case, the host operating system provides the guest with resources such as memory and processor time. Another exemplary configuration uses an "exokernel." An exokernel manages certain devices (e.g., the processor and the memory), and also manages certain types of interaction between the operating systems.

Where two or more operating systems execute on a single computer system, one may be a "high-assurance" operating system, referred to herein as a "nexus." A high-assurance operating system is one that provides a certain level of assurance as to its behavior. For example, a nexus might be employed to work with secret information (e.g., cryptographic keys, etc.) that should not be divulged, by providing a curtained memory that is guaranteed not to leak information to the world outside of the nexus, and by permitting only certain certified applications to execute under the nexus and to access the curtained memory. It may be desirable for the nexus to be the guest operating system, and a second operating system, not subject to the same level of assurance as to behavior, to be the host operating system. This allows the nexus to be as small as possible. A small nexus allows a higher level of confidence in the assurance provided by the nexus. Therefore operating system functions are run by the host operating system.

One such system function which may be run by the host operating system is a windowing system. When using a windowing system, a user's display will be populated with UIs, areas on the screen which display information from an application. An application may have one or more UIs. When security features, such as the use of a HSM, or the security features of a nexus or other guest operating system, exist in a first operating system execution environment, but are used to authenticate UIs in another execution environment, a number of additional technological and practical considerations arise.

Thus, there is a need in the industry for improved techniques to demonstrate the authenticity of computer processes to computer users.

SUMMARY OF THE INVENTION

Systems and methods for demonstrating that a User Interface (UI) is authentic can display a recognizable image to a computer user. Images are difficult to spoof, because users are not likely to ignore altered or incorrect images. An authenticated process can retrieve an image that is secured such that the image is not available unless the process is authenticated. The image can be displayed to demonstrate process authenticity. It is desirable to provide a large set of distinguishable images so that individual users are likely to have different UI authentication images, thus reducing the success rate of spoof attacks using any one image. To provide image variation any images from a set of initial images can be modified using a plurality of image modification processes, producing a large set of potential authentication images. Techniques for authenticating UIs in a virtual machine context are also discussed. Finally, a secure attention sequence is provided which allows users to test whether the processes running on a computer are authenticated. Other features and aspects of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. The file of this patent contains at least one drawing executed in color. Copies of this patent with color drawings will be provided by the Office upon request and payment of the necessary fee. In the drawings:

FIG. 4 provides exemplary outputs of exemplary image modification processes. An original image may undergo any combination of the illustrated exemplary modification processes. By producing a large number of potential authentication images, spoof attacks using any single image are thwarted because the spoofed image will not likely resemble many actual authentication images.

DETAILED DESCRIPTION OF THE INVENTION

Figure 1:
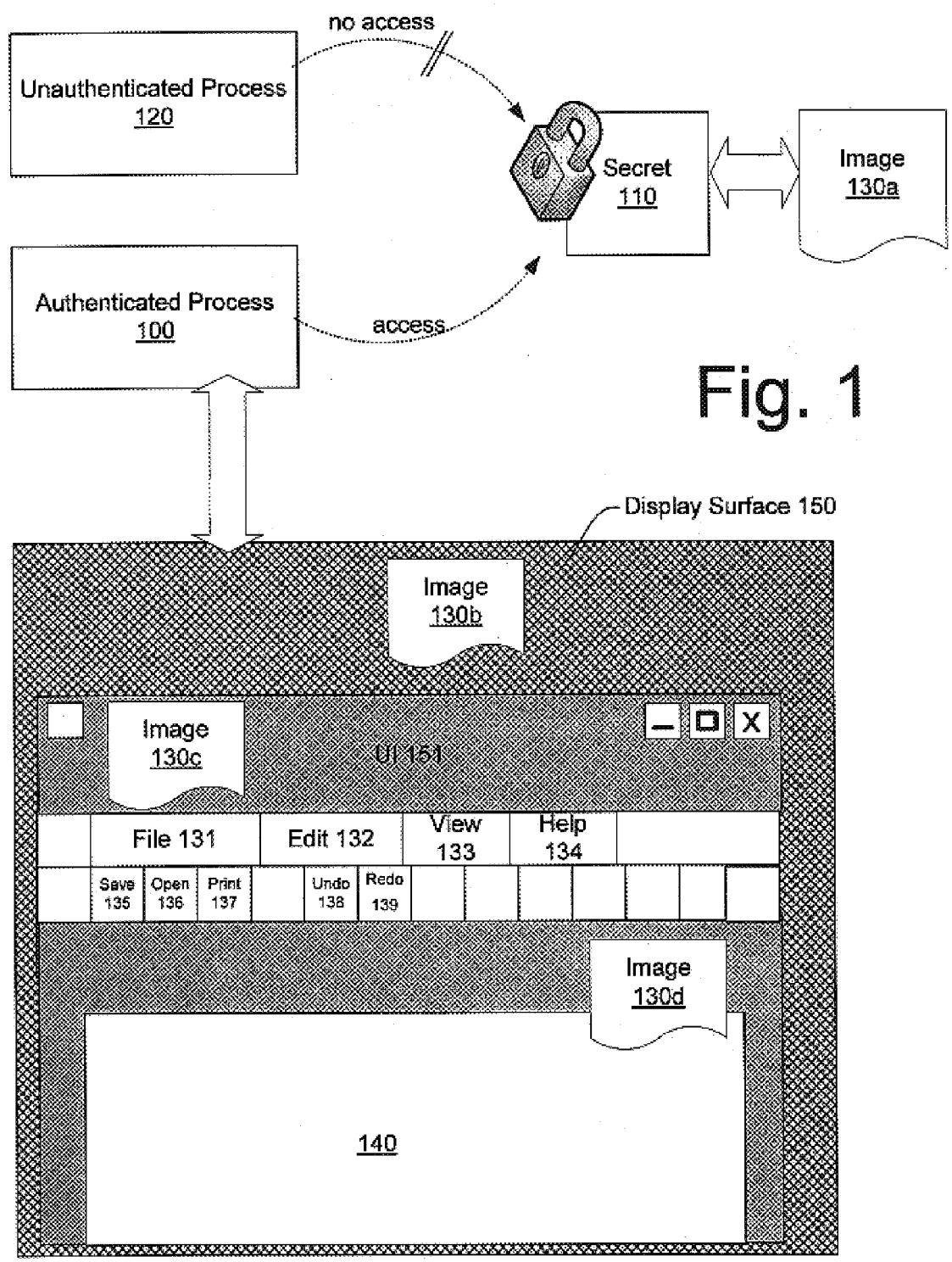
FIG. 1 is a block diagram of an exemplary authenticated process 100 which can access an image 130a which is not accessible to unauthenticated process 120. The image 130a may be placed on display surface 150 to demonstrate authenticity to a user. Exemplary locations for image 130a are illustrated by 130b, 130c, and 130d.

FIG. 1 is a block diagram of an exemplary authenticated process 100 which can access an image 130a. A number of techniques are available to authenticate a process such as 100, and the invention is not limited to any particular technique. In the embodiments discussed here, exemplary authentication techniques utilize a HSM to authenticate process 100. As will be recognized by those of skill in the art, the use of a HSM, such as a TPM, typically comprises measuring a process 100 or components associated with process 100, and submitting the measurements to the HSM. If the measurements are correct, secret 110 may be released. Thus, process 100 may be authenticated by virtue of the fact that secret 110 is released to process 100, or by virtue of the fact that secret 110 is released to some component that conducted the measurement of process 100. A brief description of the use of an HSM to authenticate a process and release a secret is provided in connection with FIG. 2.

Other authentication techniques, and in particular those that do not perform authentication using a HSM, may provide stronger or weaker authorization. A weakness of the HSM-based techniques is that if a process such as 100 is initially corrupt, i.e., corrupt at the time a secret 110 is sealed, then the process 100 may continue to be authenticated despite such corruption. Recognizing that any other authentication technique may have its advantages and disadvantages, the definition of the term "authenticated" as used here does not necessarily require an incontestable determination that a process is in fact what it purports to be. Looser criteria for authentication may be adopted based on the needs of a particular system. Some forms of authentication may operate more quickly at the cost of accuracy, and vice versa.

An authenticated process 100 can access image 130a, while unauthenticated processes, such as 120 cannot. Restricted access to image can be accomplished in any number of ways. In one embodiment, secret 110 and image 130a may be one and the same. This provides simplicity in design. Such designs may configure process 100 logic to acquire the image 130a and proceed immediately to displaying image 130a to authenticate process 100 to a user. Other designs may, for any number of practical reasons, instead provide an authenticated process 100 with some non-image secret 110, such as a decryption key, and allow process 100 to retrieve or decrypt image 130a only after it gains possession of the secret 110. In this regard, secret 110 may comprise any information that allows access to image 130a, up to and including the case where secret 110 is itself image 130a. Secret 110 may also be, for example, a location of image 130a, which is unknown without possession of secret 110.

While an image 130a is used throughout this description as the item used to demonstrate that a process 100 UI is authentic, it is recognized that a variety of media may be used for the same purpose. For example, a sound file, such as a file in the popular mp3 format, may be used as well. When an application UI is displayed, a particular sound signature that is only accessible to authenticated processes 100 might be played over a computer's speakers. The sound file might comprise a user's favorite song, voice, or other sound. Movie files, documents, and other types of files are also possible. For this reason, the term "image" is defined herein to comprise a variety of files beyond the typical definition for that word. An image 130a is any file that can be presented to a user such that the user recognizes the contents of the file.

Once image 130a is accessed by authenticated process 100, it can be displayed to a user on a display surface 150. Modern applications typically present a UI 151 to a user, which may comprise selectable menus such as file 131, edit 132, view, 133, and help 134. A UI 151 typically also comprises a plurality of selectable elements, for example 135-139, which may activate certain software program functions. In the case of menu elements 131-134, drop-down lists of program functions may be displayed. The UI workspace 140 typically displays a file which can be modified by a user. The user may modify a file in the workspace 140 using a selection device such as a mouse (not shown), which moves a cursor to a desired location in the workspace 140 or among the selectable elements 135-139. A data input device such as a keyboard (not shown) may be used to enter data at a desired location in a file open in the workspace 140. Additional properties of files displayed in a workspace 140 may be added, removed, or modified by selecting among the available functions exposed through the selectable elements 135-139.

The image 130a may be displayed as part of UI display surface 151, or simply placed on the background display surface 150. Image 130a may be presented to a user at any location. Image 130b, 130c, and 130d are displayed in FIG. 1 to illustrate potential locations for image 130a. A number of practical considerations are involved in selecting an appropriate location for image 130a, including available real estate on the UI surface 151, likelihood that a user will notice and consider the image 130a, and any user confusion as to which application UI a particular image applies to. In one embodiment, a single image may be presented on a background display surface 150 that represents authenticity of all open UIs, e.g., 151. In other embodiments, an image, e.g., 130d might be placed within and associated with just one UI 151. One can envision scenarios in which a separate image 130a is used for each application, for example, a picture of a house for MICROSOFT WORD®, a picture of a car for MICROSOFT POWERPOINT®, and so forth. If this proves confusing for users, a single image might be selected that is used by all authenticated processes to demonstrate their authenticity.

Figure 2:
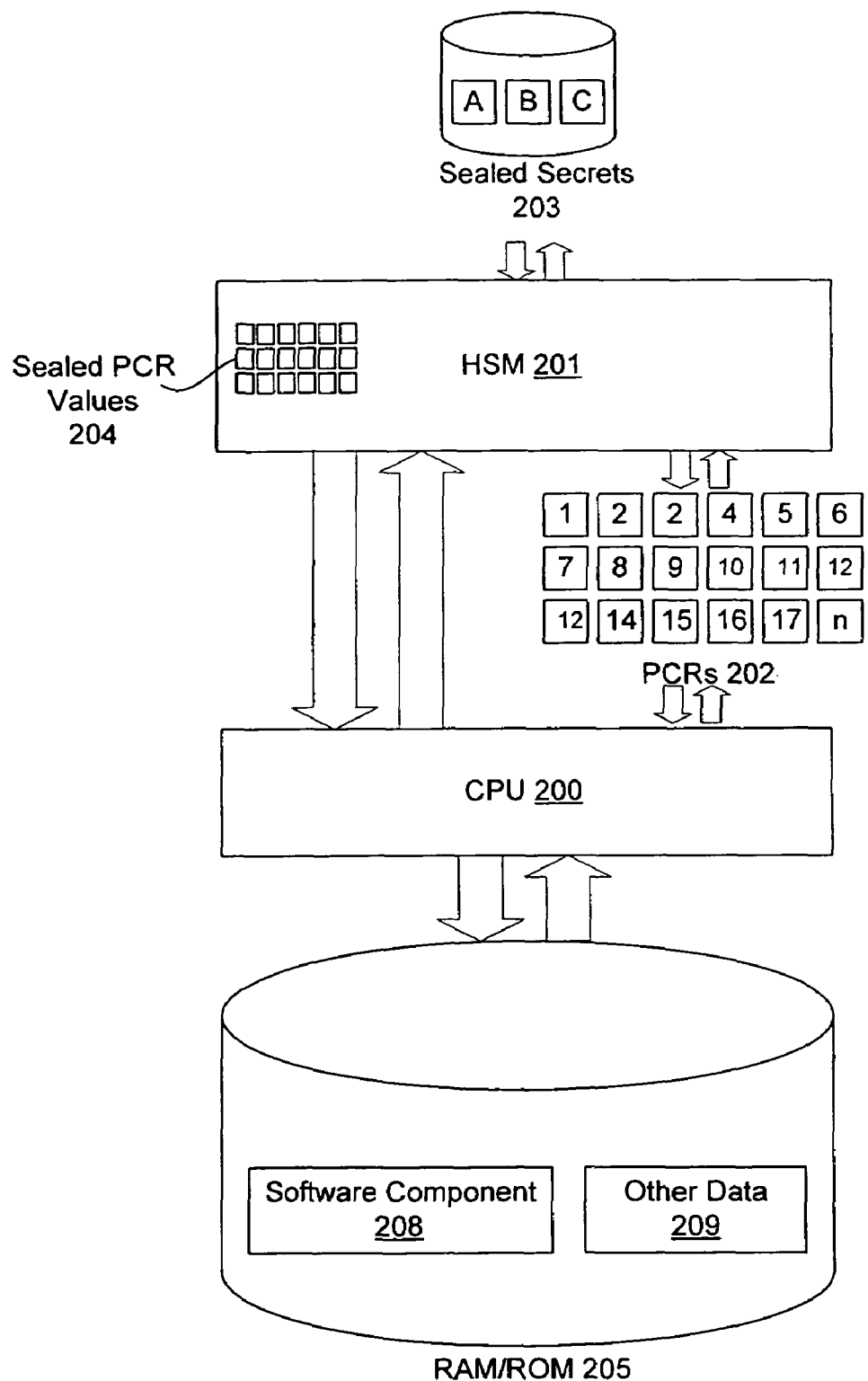
FIG. 2 is a block diagram of an exemplary security technology for allowing only authenticated processes to access an image. Sealed secrets 203 may be accessible only via an HSM 201. Access to secrets 203 may be conditioned upon placement of any number of correct values in Platform Configuration Registers (PCRs) 202. A component 208 in memory 205 may be measured, placing the measurement values in 202, thereby authenticating the component 208.

FIG. 2 presents an exemplary technique for authenticating a software component. As mentioned above, a number of techniques may be implemented, and the invention is not limited to any single technique. FIG. 2 and corresponding description are provided to demonstrate a likely implementation for accomplishing authentication.

A HSM is illustrated in the context of a computer architecture in FIG. 2. While the HSM contemplated for use in embodiments of the invention may be a TCG® 1.2 compliant TPM, any HSM 201 for validating measurements, such as those placed in PCRs 202, and for unsealing secrets 203 if the measurements are correct, may be used. In this regard, FIG. 2 presents a CPU 200 with access to memory 205, in a highly generalized view of a computer such as that of FIG. 10. The CPU 200 may rely on a HSM 201 for certain security functions. In general, the CPU 200 may first perform measurements of data 209 and/or software components 208. Initial measurements may be securely stored in the HSM 201, as illustrated by the sealed PCR values 204.

Secrets 203 may be sealed to the particular PCR values 204 in the HSM 201. To retrieve the secrets 203 from the HSM 201, correct PCR values must be entered into PCRs 202. These correct values may be obtained by measuring the same data 209 or components 208 that were measured to obtain PCR values 204 sealed in the HSM 201. Multiple secrets 203 may be sealed to a variety of PCRs 204. For example, to retrieve a first secret A, it may be required to place a correct value in PCR [1], PCR [2] and PCR [3]. To obtain a second secret B, a fourth correct value may be required in PCR [4]. Note that in various embodiments, the PCR values 202 may in fact be placed in a single register location that is extended by an algebraic formula, as defined in the TCG® 1.2 specification.

If a measurement is placed in a PCR 202 that does not match a value for that measurement sealed in the HSM 201, then when the HSM 201 is requested to unseal a secret from 203, the unseal will fail. If correct measurements are placed in PCRs 202, then the HSM 201 can be trusted to unseal secrets 203 when requested to do so. Therefore, a "correct" measurement, or correct value, for purposes of this application, is a measurement to which a secret 203 is sealed, and thereby permits unsealing of the secret 203 by the HSM 201. Note that a correct measurement could be, in some embodiments, a measurement of malicious code. This is the case, for example, when the initial measurements 204 sealed in the HSM 201 are corrupt.

The secrets 203 sealed to particular measurements 204 may be any data. Typically, secrets 203 will take the form of decryption keys and/or Binary Large Objects (BLOBS). However, images, sound files, movie files, or any other file might also be a secret in 203. In general, a decryption key provides information that can be used to decrypt data. A sealed BLOB may contain a key as well as other potentially useful data. In this regard, equivalents for various techniques discussed herein may be constructed by substituting keys for BLOBS, image files, sound files, and the like, and vice versa, as will be appreciated by those of skill in the art.

In summary, with reference to FIG. 1 and FIG. 2, an authenticated process can access an image, and can display that image to a user to demonstrate to the user that the process is authentic. Note, however, that if a single image was used to authenticate all processes on a popular operating system such as MICROSOFT WINDOWS® spoof attacks would soon adapt to incorporation of the chosen image. Thus, it is desirable to provide variation of images used. Variation of the authentication image prevents any single spoof attack from success in a so-called "build once run many" format. Such attacks allow attackers to launch a single attack on many users and thus take advantage of a statistical probability that at least some victims will emerge.

A first solution for creating variation among authentication images is to allow users to select a customized image. User's personal images are endlessly variant and highly recognizable. A mother or father might use a picture of their child, a pet owner might choose a picture of their dog, other users might choose a self-portrait or a picture of their friends, and so forth. However, many users may not have personal images in digital format to select from. These users should be provided with a selection of stock authentication images.

Even a large number of stock images may subject some people to "build once run many" spoof attacks. If a selection of one-thousand (1000) images is provided, then an attacker may choose one of the provided images, and have a chance at successfully attacking one in one-thousand computer users of products incorporating the invention. Thus, it is desirable to provide systems and methods to create a very large number of potential image variations, while also ensuring that the image variations remain recognizable by computer users.

Figure 3:
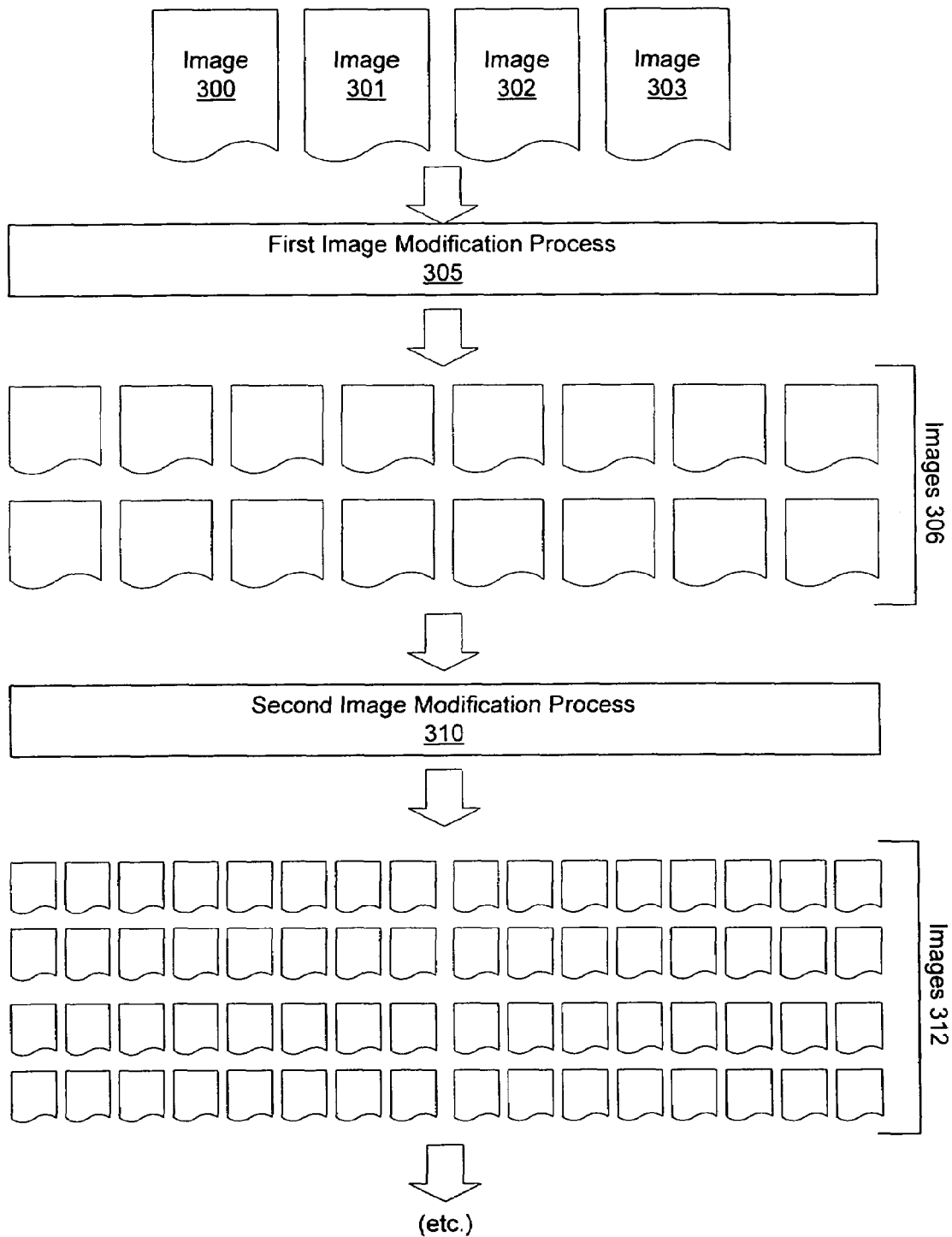
FIG. 3 illustrates operation of image modification processes 305, 310 to produce a multitude of distinguishable images 312 for use as authentication images. Images 312 may be derived from a smaller set of initial images 300-303.

FIG. 3 illustrates exemplary systems and methods for creating a large number of recognizable image variations from a set of original images. A small set of original images, such as images 300-303, can be processed to produce a significantly larger set of images, such as images 312. As illustrated in FIG. 3, this can be accomplished by one or more stages of image modification.

A first exemplary stage of image modification can comprise operation of a first image modification process 305 on images 300-303, or a subset thereof. The first image modification process 305 may be, for example, an image subsection or image slicing process. By taking a subsection of an original image, quite a different image can be produced. For example, a subsection of an image comprising three flowers may comprise only one flower, which is certainly a recognizable variation. Exemplary outputs 411, 412, 413 from a subsectioning process are illustrated in FIG. 4. A subsectioning process may slice and dice an image in any manner, from taking very small image subsections to rather large subsections. Subsections that are too large may not produce significant variation from an original image, while subsections that are too small may become simply monochromatic panels. Thus, a middle ground is most appropriate. As part of a first image modification process 305 an image subsection can also be mirrored, rotated and/or flipped randomly to produce a larger set of distinguishable output images. The subsections can also be scaled down from a larger image to further increase the number of possible distinguishable slices from a given original image. At any rate, the operation of the first image modification process 305 can produce a somewhat larger number of potential authentication images 306.

An exemplary second image modification process 310 may then be applied to images 306, or a subset thereof. The second image modification process 310 can be, for example, an image mutation process. This can be a simple transformation of images 306 by the application of one of a variety of algorithms well known in computer graphics. The outputs of exemplary image modification processes 310 are illustrated in FIG. 4. Exemplary processes are:

Hue Rotation 420—The color of each pixel can be represented in a $3d$ color space such that it is represented as 2 chroma components and one luminance component, this can be rotated by a randomly chosen angle around the luminance axis. 421 is an exemplary output image of a hue rotation process.

Negative 430—the color negative of a subsection can be used. 431 is an exemplary output image of a negative process.

Alpha Blending 440—a color gradient fill (vertical/horizontal etc) can be blended over the top of the image. 441 is an exemplary output image of an alpha blending process.

Shape overlay 450—a regular geometric shape can be superimposed over an image, this shape may have a randomly chosen number of sides, color, position on image, etc. 451 is an exemplary output image of a shape overlay process.

Screen 460—a geometric transparent screen can be applied to an image. 461 is an exemplary output image of a screen process.

Other image modification process are available, and can trivially be designed from a review of computer graphics literature.

The result of this second image modification process 310 is a further increased number of potential authentication images 312. A further image modification process may be applied to images 312, or a subset thereof, if necessary. For example, a text string in arbitrary size and position may be drawn on top of an image. This can most conveniently be constrained such that an arbitrarily chosen string avoids geopolitical sensitivity issues by limiting the pool of characters to single characters from well constrained ranges, with those ranges chosen to be appropriate to the locale of the installation. 471, 472, 473, and 474 are exemplary outputs from a text string overlay process 470.

Generating all of the image variants each time an authentication image is to be produced is impractical where there is a large number of potential image variants. Instead, some subset of images can be chosen at each stage. As a final stage, if desired, the user can be presented with a reasonable selection of authentication images to choose from.

The operation of the above exemplary image modification processes in sequence operates to produce a potentially enormous number of image variants. This is positive, because a greater number of image variants, when used as authentication images, results in less likelihood of success for spoof attacks that use a single image or small set of spoofed images. In some embodiments, the number of image variants can increase with each image modification process as provided in the following table:

| | Variations | Total Variants |
|---|---|---|
| Stage 0 | | |
| 256 large source images, chosen to be visually rich | $2^8$ | $2^8$ |

-continued

|  | Variations | Total Variants |
|---|---|---|
| Stage 1 |  |  |
| 64 distinguishable slices from the 256 source images | $2^6$ | $2^{14}$ |
| Stage 2 |  |  |
| Hue Rotation - 16 possible variants | $2^5$ | $2^{19}$ |
| Negative - 1 variant |  |  |
| Alpha Blend - 32 variants |  |  |
| Shape - 32 variants |  |  |
| Screen - 32 variants |  |  |
| Stage 3 |  |  |
| Character - 64 variants | $2^6$ | $2^{25}$ |
| Color - 16 variants | $2^4$ | $2^{29}$ |
| Size/Position - 16 variants | $2^4$ | $2^{33}$ |

By applying the image modification process as outlined in the above table, $2^{33}$ potential image variants can be produced from an initial set of 256 original images. $2^{33}$ represents approximately 8.5 billion images. This number provides reasonable protection because the number of users vulnerable to a spoof attack with a pre-coded image remain small.

Note that the number of actual variant images, using the above techniques, may be much higher. The numbers in the table were chosen to allow for images that might not be readily distinguished by users. For examples theoretical image subsections could differ by a single pixel horizontal offset, but a user is exceedingly unlikely to notice such a difference. If we consider a source image that is 800×600 pixels (a typical minimum size for distribution of visually rich images) there can be seen to be 121 slices (11×11) of size 120×90 pixels, such that no two slices overlap by more than 50%. To be cautious, we round that number down to the nearest power of 2. In a similar manner, we constrain the number of distinguishable variants of the mutation and text stages.

Consider an attack launched at a large number of machines. Let us assume that an attacker can execute code on the attacked machines and display simulated UIs to the users. To spoof a user whose computer system incorporates the invention, an attacker must guess the user's authentication image. The chances of the attacker guessing the correct image are very small given the number of possible images (approx 8.5 billion) and the number of compromised machines, which would be some subset of the install base, not likely to exceed the planetary population soon.

Of course, the above depends on the user recognizing when an image being displayed is not their selected authentication image. This rests in turn on two fundamentals, first, that the user recognizes that an image is incorrect, and second, that the user understands that a UI displayed with the incorrect image is hostile and should be treated in the same light as discovering any attack on the system. Preliminary studies have shown that users recognize when such an image changes. The second issue is one of general user education.

Figure 5:
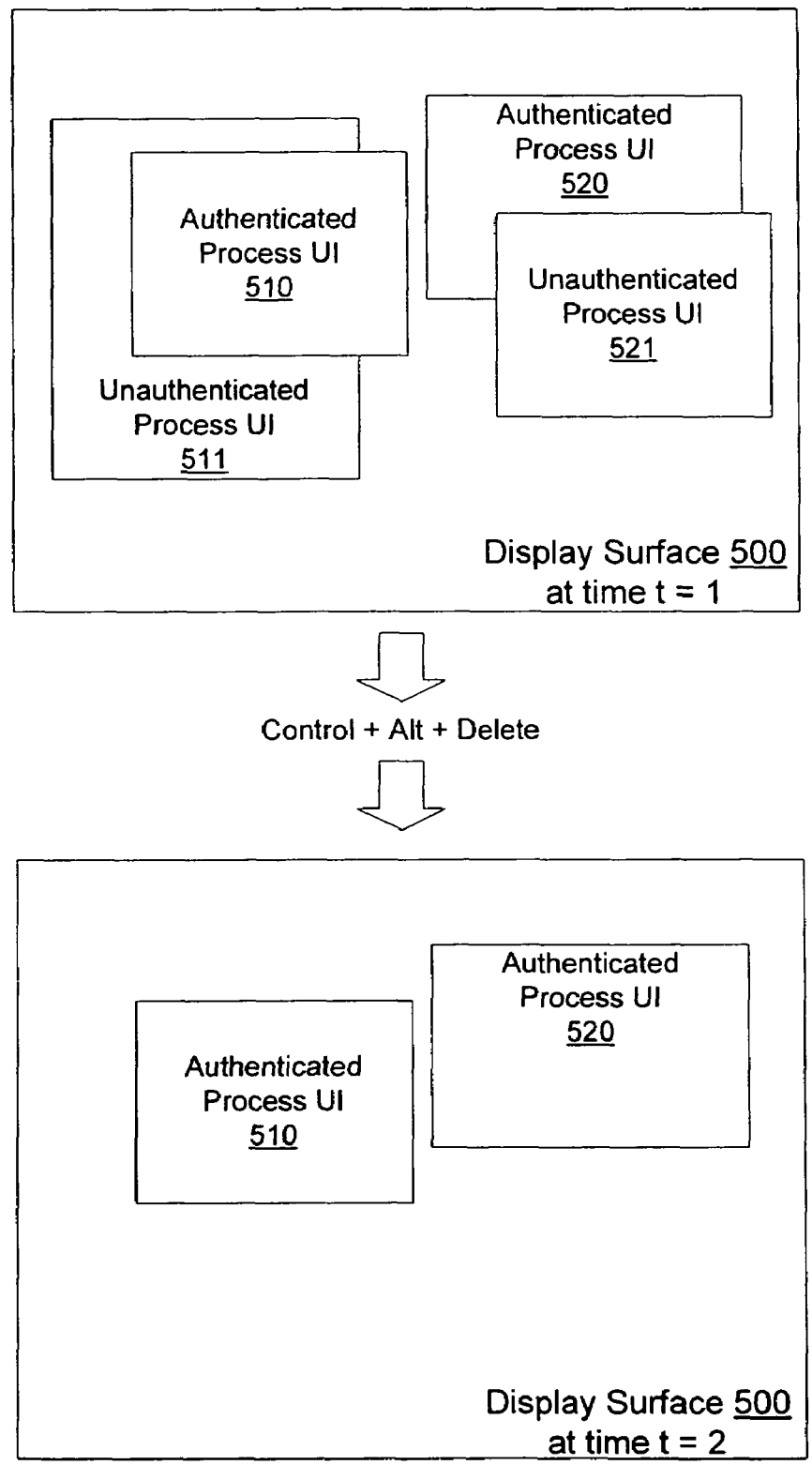
FIG. 5 illustrates operation of a secure attention sequence, such as Control+Alt+Delete to remove any UIs produced by unauthenticated processes, e.g., 511, 521, from a display surface 500.

FIG. 5 illustrates an aspect of the invention that will be referred to as the Special Secure Attention Sequence (SSAS). The term "Secure Attention Sequence (SAS)" is known in the art, and refers to a key sequence that begins the process of logging on or off. The default sequence is CTRL+ALT+DEL. The concept of a SAS is well understood within the context of modern operating systems, such as MICROSOFT WINDOWS®. We extend the concept of the SAS. As illustrated in FIG. 5, a SSAS (such as CTRL+ALT+DEL or any other combination of keystrokes) may be used.

By depressing the SSAS, a user may bring about the illustrated effect. A display surface 500 at time t=1 displays a plurality of UIs, some of which are produced by authenticated processes, namely 510 and 520, and some of which are produced by unauthenticated processes, namely 511, 521. In one embodiment, the SSAS may cause disappearance of all unauthenticated UIs, as illustrated in display surface 500 at time t=2.

While UIs are illustrated here, both authenticated and unauthenticated processes may also cause any number of non-UI type graphics to be presented on display surface 500, and such graphics may also be subject to the operation of the invention described here. Disappearance of unauthenticated UIs 511 and 521 may be due to termination of corresponding unauthenticated processes, or may be simply a revocation of access by such processes to display surface 500. Various alternative embodiments of the invention may cause the authenticated, rather than the unauthenticated processes to appear. In another variation, a list of running processes may appear, with an indicator as to whether the processes are authenticated or not.

Embodiments of the invention may be implemented as part of a concerted effort to secure a user's access to and control of data and processes that modify and display data. Technologies directed to this goal in general protect the confidentiality, integrity and availability of data displayed by a computer system. These technologies may include, for example, those that protect characteristics of data, those that provide secure execution environments, those that guarantee the integrity of input to a computer system, those that provide trusted graphics, those that mitigate spoofing attacks, those that provide for communication of context, and those that provide for secure data migration.

A spoof attack occurs when an attacker causes a UI to be presented to a user in such a manner as to mislead the user as to the origin of the UI. A trusted UI, in accordance with the techniques provided here, contains mechanisms to securely communicate the origin of a UI to a user.

In a system with trusted graphics, display surfaces such as UIs can have properties that relate to their security characteristics. There are generally two classes of display surface: First, there are regular surfaces, which generally do not have security features. Presently, the primary display surface on a graphics adapter is typically a regular surface.

Second, there are trusted surfaces, which generally do have properties for protecting confidentiality and integrity. If a computer system supports trusted surfaces, such surfaces can also provide a higher level of availability. Trusted surfaces may have any of a number of security features, including, for example, a guaranteed display position above regular surfaces, integrity protection features, and confidentiality features.

In present systems, a user is not given any indication of the security features that a particular surface possesses. In modern operating systems there are few if any constraints on the shape and appearance of a given UI. Embodiments of the invention provide some information that the trusted parts of a system, such as a trusted process, can display to a computer user to indicate that it is trusted. Such information can be trusted when it is not available to an un-trusted entity on the system.

Using the capabilities of a trusted system, data can be stored such that it is only available to a Trusted Computing Base (TCB). A TCB is software that utilizes the security features of a TPM, and analogous secure systems. For the purposes of this disclosure, a TCB can comprise any security technology that is generally responsible for authentication and trust of computing components executing on a particular system. As described above with reference to FIG. 1, a first solution for authenticating a UI to a computer user can include the use of data which is known only to the TCB and to the user. Such data may be referred to as a "nexus-user secret." With reference to FIG. 5, a second solution includes extending the concept of the secure attention sequence.

In computer systems with a Trusted Computing Base (TCB), and analogous secure systems, the TCB accesses keystrokes before all other components of the system. Thus a trusted system with an isolated secure input path can be sure of two things: first, the user input that it receives was not generated by software running on the local machine, and second, no software running on the local machine has received the user input until components in the TCB choose to propagate that information to such components.

This can be used to allow a user to perform a simple challenge-response with a TCB. As illustrated in FIG. 5, a user can issue a challenge (the SSAS) and the TCB can respond by displaying UIs which are considered trusted, by virtue of their ability to access and display the image. Furthermore, the TCB can ensure, for example, by using the property of "always on top" enable by secure graphics hardware, that only surfaces, such as UIs and other graphics, with certain properties are displayed when requested. In other words, the SSAS need not be limited to choosing between "authenticated" or "trusted" and "unauthenticated" or "untrusted." Instead, where a number of security features exist, the SSAS may operate to display UIs or other graphical objects with a particular set of security features.

For example, the user may make a challenge such as, "Show me only those surfaces which have the properties Integrity-Protected ∩ Confidential ∩ Always-On-Top." This provides a user-directed mechanism to protect against UI spoofing. If a user is unsure of the status of what they see they can address a challenge (SSAS) to the TCB.

In one embodiment, the TCB can first offer reassurance to its own identity with the authentication image. Next, by controlling the always on top capability of a trusted graphics adapter, a TCB can ensure that only appropriate surfaces are displayed. The user can therefore satisfy themselves as to the security properties of any questionable surface: if the surface is still displayed after an SSAS, the surface must have the required properties. If the surface is not displayed it must not have the required properties.

Figure 6:
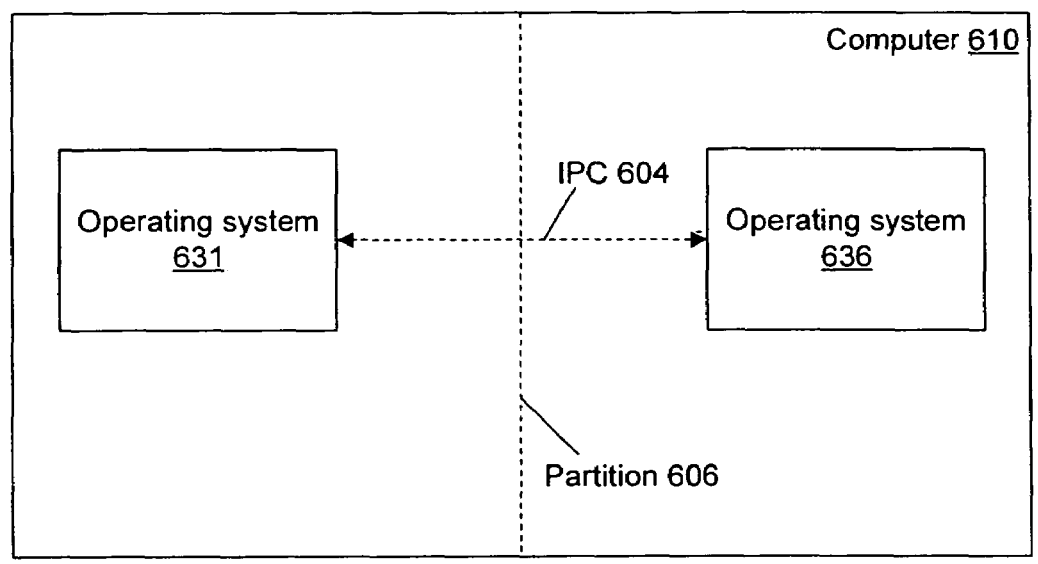
FIG. 6 is a block diagram illustrating coexistence of two operating systems 631, 636 on a single computer 610.

FIG. 6 displays a mixed computing environment, in which two or more operating systems 631, 636 coexist on a single computer 610. It is known in the art that two or more operating systems can execute side-by-side on a single computing device 610. In a typical virtual machine arrangement, the two operating systems 631, 636 may comprise a host 631 and a guest 636. A third, fourth, fifth, or any additional number of operating systems may also execute as guest operating systems. A host operating system 631 may provide hardware device services to one or more guest operating systems 636.

The host 631 may be natively compatible with the system 610 hardware while the guest 636 is not. In this case a host 631 can emulate hardware for the guest 636. The host 631 can emulate the hardware of any computer system, including the very hardware 610 which the host 631 itself is designed for. Also, just as a host 631 can emulate a computer, a guest 636 can also emulate a second computer. Therefore the techniques described herein may be used in the context of interaction between guests, hosts, or any combination thereof.

This host/guest(s) arrangement allows the host 631 and guest(s) 636 to execute independently. However, it is occasionally desirable to provide some interaction between operating systems. Some type of logical separation may exist between operating systems 631 and 636, such that a certain amount of interaction is permitted between operating systems 631 and 636, while still allowing at least one of the operating systems to be protected against events that originate in the other operating system. The separation is typically reflected by a virtualization boundary 606.

The interaction between the operating systems 631, 636 may be accomplished through inter-process communication (IPC) 604. IPC 604 may comprise a set of programming interfaces that allow program processes, such as those of 631 and those of 636, to coordinate their activities. A set of IPC interfaces make this possible. IPC methods comprise pipes and named pipes; message queuing; semaphores; shared memory; and sockets. Each IPC method has its own advantages and limitations. Any IPC 604 techniques presently used in the art or later developed may be used in conjunction with the other various techniques disclosed here.

The interaction between operating systems 631 and 636 may be monitored by a security monitor. A security monitor is typically a component external to operating systems 631 and 636 which provides some security services that may be used to protect operating system 636 from operating system 631. For example, a security monitor may control access to certain hardware, may manage the use of memory (to give operating system 636 exclusive use of some portions of memory, a.k.a. a memory context), or may facilitate the communication of data from operating system 631 to operating system 636 in a secure way. It should be noted that the use of a security monitor represents one model of how operating system 636 can be protected from operating system 631 although the use of a security monitor is not required. As another example, operating system 636 could include all of the functionality necessary to protect itself from operating system 631.

It should be noted that the parameters of what makes an operating system a "host" or a "guest" are flexible. In the examples that follow, we shall generally refer to operating system 631 as the "host" and operating system 636 as the "guest" for the purpose of distinguishing between them. It should be appreciated that the techniques described herein can be applied to the interaction of any two or more operating systems running on the same machine or on the same set of connected machines. Certain other techniques may be implemented to allow operating systems 631, 636 to exist side-by-side. The invention may be implemented in the context of any and all of the various virtualization architectures known in the art or as they are developed with the progress of virtual machine technologies.

In a computer 610 that runs multiple operating systems, such as that of FIG. 6, it may be desirable or necessary for there to be distinctions between the operating system UIs. For example, a multi-operating system environment could be configured such that the separate operating systems 631, 636 had different security policies. The policy of a given operating system 631 may be designed to be appropriate for the tasks designated for that partition.

In such a configuration, various embodiments of the invention may allow a computer 610 as a whole to be capable of unambiguously communicating to a user the security features available from an operating system with which a particular UI is associated. For example, a user can be informed as to which operating system 631 or 636 originates each UI that is presented to the user. By including an authentication image with a UI, the various operating systems 631, 636 on a computer

610 can optionally convey the secure status of applications running on the operating system. If an operating system displays an authentication image for a UI, the user can be assured that the operating system has authenticated the corresponding application.

There are several display arrangements used today to allocate display space to the multiple operating systems that may execute simultaneously on a computer. Exemplary display arrangements are provided in FIG. 7, FIG. 8, and FIG. 9. Note that in each arrangement, authentication images may be used to indicate the security level of applications executing on a host, the security level of any guest operating systems, and/or the security level of applications executing on guest operating systems.

Figure 7:
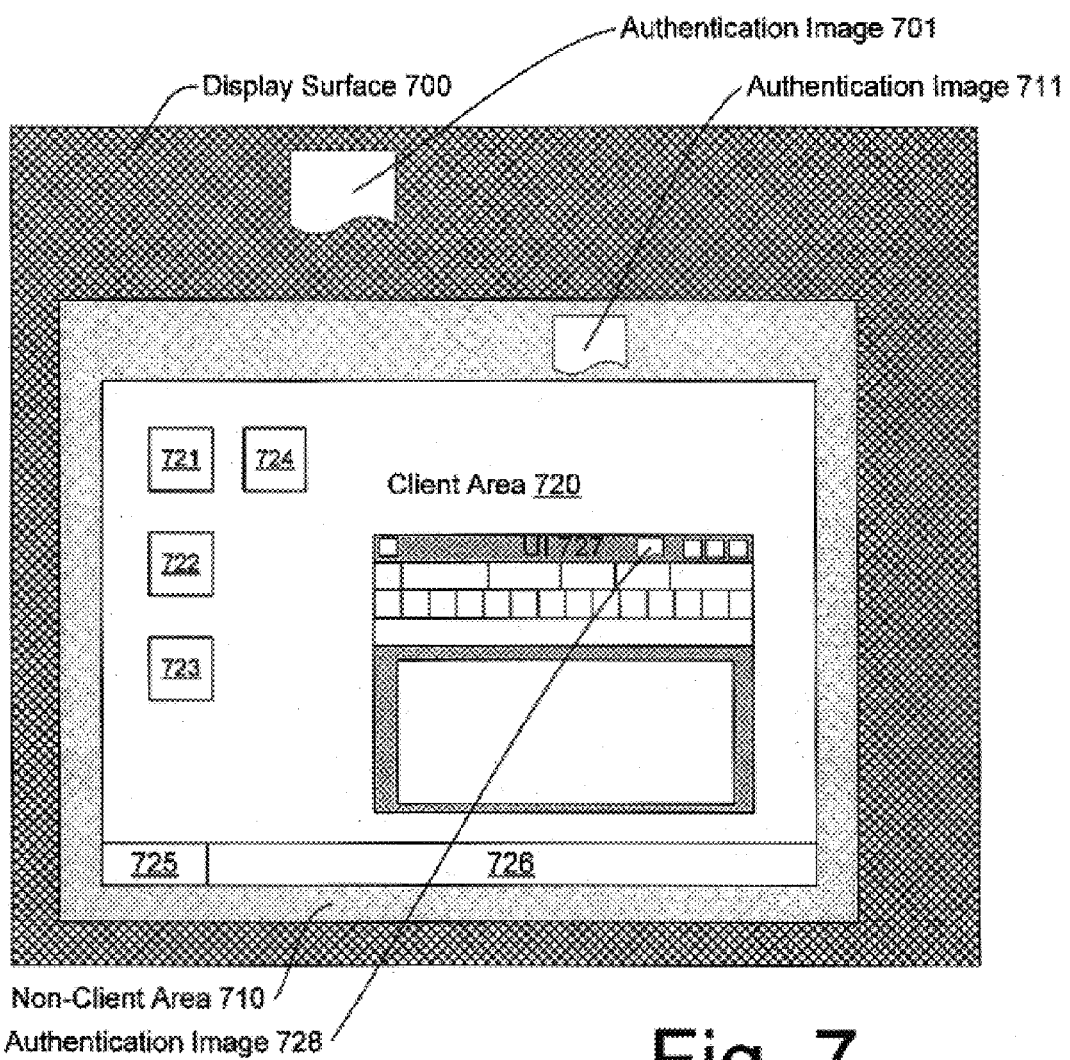
FIG. 7 illustrates an exemplary display surface 700 which may be controlled by a first operating system, and a "GuestTop" display with a client area 720 controlled by a second operating system. The systems and methods presented herein may be utilized to authenticate the guest operating system itself as well as UIs within the client area 720.

FIG. 7 displays a "GuestTop" arrangement. A guest may control a portion of a display such as client area 720. Client area 720 is surrounded by a non-client area frame 710 that is in turn presented on the host-controlled display surface 700. Thus a guest and guest applications control all UIs such as 727 within its designated client area 720, but cannot control the display surface 700 beyond the non-client area frame 710. A host may ultimately have control over the existence of the frame 710, and may terminate the frame 710 if desired, but may not control the UIs 727 that are presented within the frame 710. Multiple guest operating systems may each be allocated a frame such as 710 on a surface 700, in which they may each display their own GuestTop screen. The term "GuestTop" refers to a guest operating system and a desktop display that may be presented in the client area 720. Elements of a desktop may be, for example, icons 721-724, start button 725, and control bar 726.

In the GuestTop display arrangement, an authentication image 701 may be displayed by a host operating system on display surface 700 to indicate authentication of the host desktop and/or applications that are executing on the host operating system. Authentication image 711 may be placed in the non-client area frame 710 by a host operating system to indicate that the guest operating system controlling the client area 720 is authenticated. If the guest operating system also has security features such as those described herein, it may engage in application authentication and present one or more of it's own authentication images. For example, an authentication image 728 may be presented to demonstrate that a UI 727 is produced by an authenticated application running on the guest.

In an exemplary virtualization architecture, a hypervisor system is provided in which two or more operating systems have direct, non-virtualized access to hardware. A first operating system may be referred to as a primary partition, while the second is referred to as a service partition. The service partition may be considered part of a Secure Virtual Machine Monitor (SVMM). The service partition may only have access to dedicated hardware designed to support a trusted environment (i.e., Trusted Input, Trusted Graphics, TPM). This means that there may be two or more partitions that can access graphics output hardware: the primary partition, using a conventional graphics path; and the service partition, using a trusted graphics path.

In such a virtualization arrangement, the service partition can, for example, control the non-client area 710, while the primary partition controls the client area 720, and vice-versa. In the normal case, the client area 720 is a rectangular area that may contain data drawn and managed directly by an application. The non-client area 710 is the decorative framework surrounding the client area 720, drawn and managed by the windowing system components of an operating system.

In another virtualization arrangement, the non-client area 710 may be the frame that is drawn and managed by a host operating system, for example by Trusted UI Engine (TUE) components in a Secure Virtual Machine Monitor (SVMM) that is incorporated in a host operating system. For those guests that are defined as requiring a trusted path to the user, the client area 720 may also be drawn using a trusted graphics path. Other guests may be drawn using the conventional graphics path in the primary partition.

Figure 8:
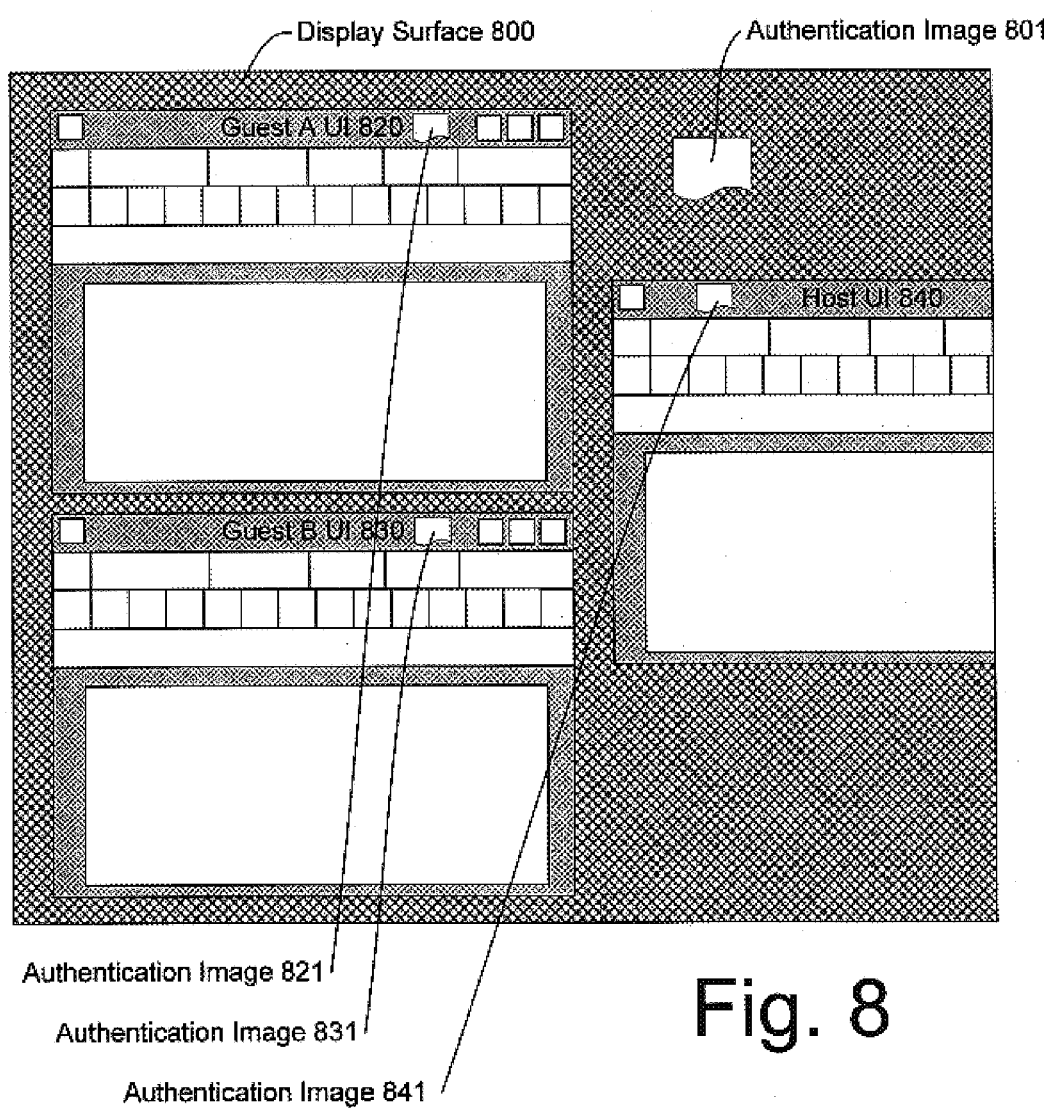
FIG. 8 illustrates an exemplary display surface 800 which may be controlled by a first operating system or dedicated display control partition. UIs such as 820, 830, and 840 may be presented to users in a unified model, where the various operating systems are not limited to use of the client area 720 from FIG. 7. Authentication images 801, 821, 831, and 841 may be produced and displayed by the various associated operating systems to demonstrate the security of corresponding UIs 800, 820, 830, 840.

FIG. 8 presents a unified display model, in which UIs 820, 830 controlled by different guests, such as Guest A and Guest B, and/or UIs 740 controlled a host, are presented on a common display surface 800. Such an arrangement maybe accomplished by a more advanced hypervisor environment than the GuestTop model described above. In a computer system associated with a display such as that of FIG. 8, hardware access can be assigned on a per-partition basis. In this environment it is possible to build a system where there is an Input/Output Service Partition (IOSP). Such a partition has input and graphics hardware available to the system assigned to it and manages final display composition on behalf of all partitions. The IOSP is then only responsible for input and graphics arbitration.

In this implementation, UI management and graphical shell capabilities can be included in the IOSP, or can be maintained in a service partition dedicated to such functions. This decision depends on security requirements; on performance constraints of the mechanisms used for inter partition communications and on the overhead associated with executing an independent partition. Pragmatically, UI management may well appear to belong in the IOSP, while a client partition provides shell services.

Some embodiments may require that UI management and desktop composition models of the guest operating systems, Guest A and Guest B, be enlightened. This enables the guests to delegate the UI management and composition to an IOSP. There are three levels of enlightenment available to a guest operating system:

Unenlightened—the guest is unaware that it is running in a multi-partition environment. The SVMM needs to provide virtualization services for IO. The guest's display output appears in a GuestTop.

Enlightened device drivers—some of the guest's device drivers are designed for the hypervisor and can optimize communication to the relevant system capabilities. This primarily adds performance benefits. The guest's display output appears in a GuestTop, but that GuestTop can be resized.

Enlightened guest OS—the window manager and desktop composition of the guest operating system is enlightened. The guest can display individual windows through the IOSP.

For those guest operating systems, e.g., Guest A and Guest B, that are appropriately enlightened, applications running within those guests may share one unified desktop display surface 800. Their UIs 820, 830, may be displayed in a visual environment common to all guests. A centralized UI management partition may be responsible for drawing frames for UIs 820, 830, 840. This allows the centralized system unambiguously to display UIs 820, 830, 840 that accurately represents the source of the UI.

The centralized system described can comprise security functions, and centralize the task of providing authentication images 801, 821, 831, 841 to host and/or guest UIs 800, 820, 830, 840. In other embodiments, the guests, host, and centralized UI management can cooperate to determine when an authentication image is to be placed in a UI. For example, Guest A may comprise security features that authenticate an application and pass an authentication image 821 to the centralized UI management. The UI management can then manage placement of the authentication image 821 in the Guest A UI 820 non-client area.

Many modem applications choose not to use window decoration and eschew conventional rectangular windows. Policy decisions can be used to determine how to handle those cases. In one case a guest could have a setting that mandates that all UIs are decorated—in which case the UI management would draw decoration regardless of the shape or settings of the UI. Alternatively a guest may not determine any particular behavior for UIs presented by guest applications. In this case the UI management can not normally draw decoration for UIs that request no decoration.

Global system UIs may also allow a user temporarily to override settings and mandate that decoration be drawn. This allows the user to verify for themselves the origin of UIs. Because UI management and output capabilities may be configured to occur within trusted parts of a computer system, the UI decoration, such as authentication images as provided here, can give a strong indication of the origin of a UI.

Figure 9:
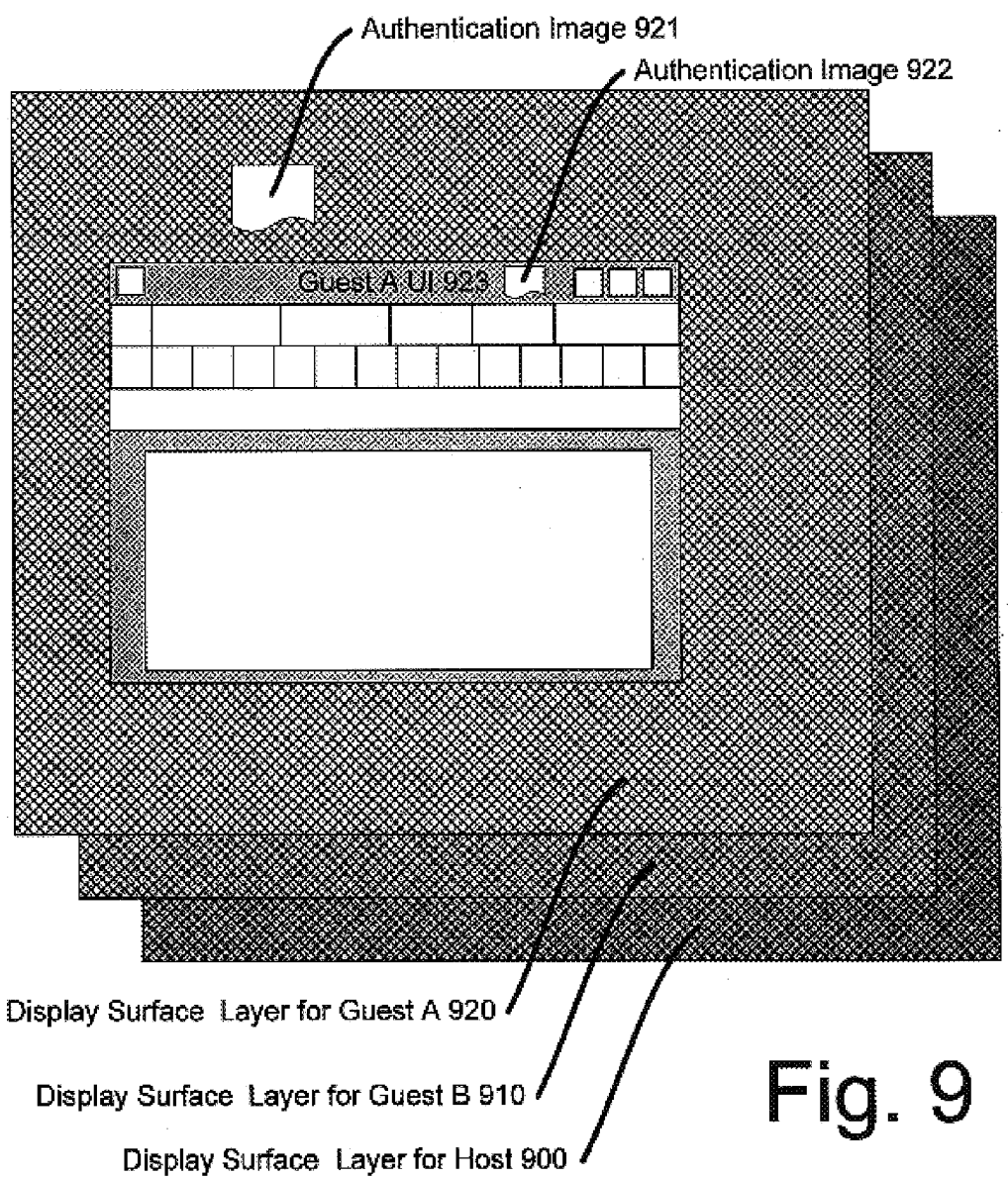
FIG. 9 illustrates a layered approach to display sharing by multiple operating systems, and corresponding use of authentication images within each layer. Here, layers may be controlled by individual operating systems, and users can switch between operating systems by switching between layers. At each layer, an operating system may use authentication images to demonstrate the security of applications.

FIG. 9 presents a layered desktop model that builds on top of the Unified Desktop Model of FIG. 8. In a layered desktop model, each operating system may display a unified desktop that is physically separated by a layer from other operating systems executing on the same computer. Thus, Guest A may control layer 920, while Guest B controls layer 910, and host controls layer 900.

Each guest may contribute to one layer. The Guest A layer 920 is on top in FIG. 9. Features similar to those present on layer 920, except controlled by Guest B and host, respectively, may be assumed to be present on layer 910 and layer 900. Application UIs, e.g., 923 from a fully enlightened guest, e.g., Guest A, are drawn within a layer 920. This provides a logical grouping of UIs.

System UIs can provide an ordered series of UI elements, such as tabs (not shown), where each tab provides a point of reference for a layer. The order of the tabs may be identical to the logical order of the layers 900, 910, 920. This can provide a connection between partition identity and window decoration. A common UI theme, such as color, can be established between tabs and windows. Tabs can also provide mechanisms to lock and unlock partitions, make a legacy partition active/inactive, change the visibility of a partition, discover/examine partition properties.

Authentication images may be presented by each operating system within its own layer. Thus, Guest A may present authentication images 921, 922 within layer 920. As explained above, the authentication images 921, 922 may be placed in a variety of locations depending on the security message that is to be conveyed to users and the real estate available for placement of images 921, 922. Placement of an image 922 in a UI 923 may send a security message that is targeted to the UI 923, while an authentication image such as 921 may more generally pertain to the security of an operating system and possibly all applications executing thereon.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

Figure 10:
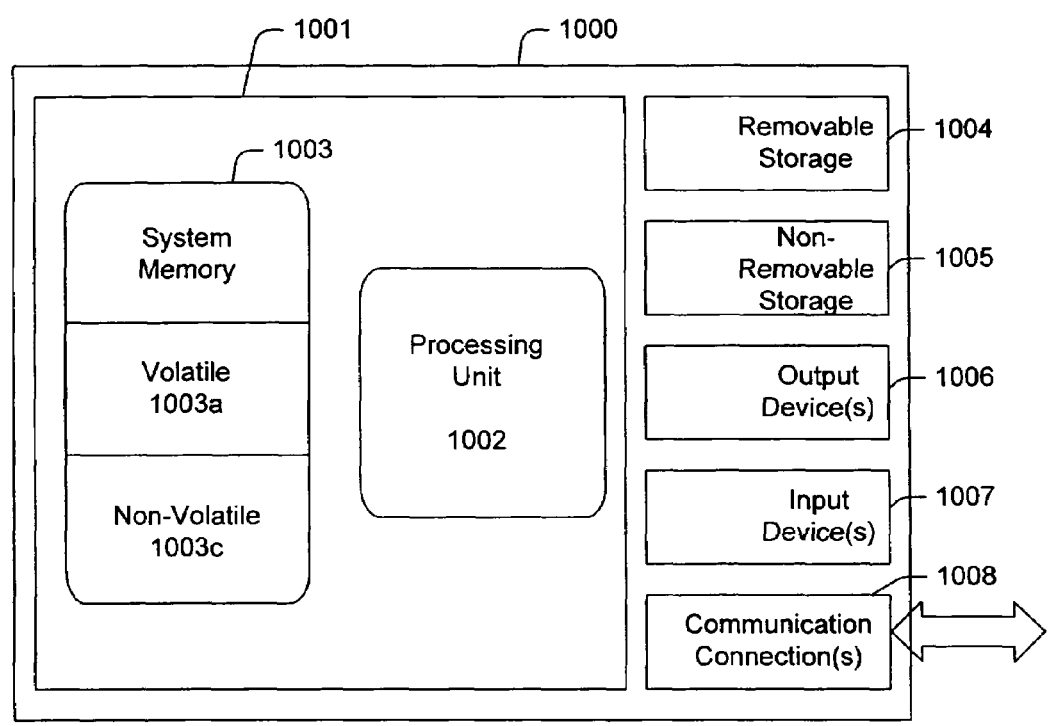
FIG. 10 is a block diagram broadly representing the basic features of an exemplary computing device suitable for use in conjunction with various aspects of the invention. The computing device may access instructions on computer readable media, and execute those instructions in an appropriate sequence for performing the functions of a certificate issuing system.

With reference to FIG. 10, an exemplary computing device 1000 suitable for use in connection with the systems and methods for authenticating a user interface to a computer user is broadly described. In its most basic configuration, device 1000 typically includes a processing unit 1002 and memory 1003. Depending on the exact configuration and type of computing device, memory 1003 may be volatile 1003A (such as RAM), non-volatile 1003B (such as ROM, flash memory, etc.) or some combination of the two. Additionally, device 1000 may also have mass storage (removable 1004 and/or non-removable 1005) such as magnetic or optical disks or tape. Similarly, device 1000 may comprise input devices 1007 such as a keyboard and mouse, and/or output devices 1006 such as a display that presents a GUI as a graphical aid accessing the functions of the computing device 1000. Other aspects of device 1000 may include communication connections 1008 to other devices, computers, networks, servers, and so forth using wired or wireless media.

Volatile memory 1003A, non-volatile memory 1003B, removable mass storage 1004 and non-removable mass storage 1005 are examples of computer readable media. Computer readable media may comprise communication media as well as computer storage media. Communication media typically embodies computer readable instructions, data structures, program Modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computer storage media may be implemented in any method or technology for storage of information such as computer readable instructions, data structures, program Modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium.

The invention may be implemented, at least in part, via computer-executable instructions, such as program Modules, being executed by a computer 1000. Generally, program Modules include routines, programs, objects, components, data structures, etc. that perform particular tasks or implement particular abstract data types.

Computer executable instructions are generally embodied as digital information available to computer 1000 on some form of computer readable media. In FIG. 10, for example, system memory 1003 may store an operating system and application programs as well as other program Modules and program data. Applications and such may be bundled with an operating system, or may exist separately and draw upon operating system services to function.

It should be understood that while embodiments of the invention described herein may be software implementations, the various techniques described herein may also be implemented by replacing hardware components for at least some program Modules. Thus, while the methods and apparatus of the present invention, or certain aspects or portions thereof, may take the form of program code in a high level procedural or object oriented programming language, the program(s) can also be implemented in assembly or machine language, if desired. In any case, the language may be a compiled or interpreted language, and combined with hardware implementations.

We claim:

1. In a computer system comprising a plurality of operating systems in a virtual machine arrangement, such that multiple operating systems simultaneously utilize processing resources associated with said computer system, a method for demonstrating that a User Interface (UI) associated with a one of said operating systems is authentic, said method comprising:

measuring, by a first operating system, digital information associated with a second operating system, and thereby obtaining a value;

comparing said value to a previously measured value for the digital information;

obtaining an image, wherein said image is only accessible if said value matches said previously measured value, wherein obtaining the image indicates that the user interface was authenticated; and indicating to the user that the user interface was authenticated by displaying said image in a non-client area frame surrounding a display space for said second operating system.

2. The method of claim 1 wherein said obtaining an image is accomplished by requesting a Hardware Security Module (HSM) to release said image.

3. The method of claim 2 wherein said Hardware Security Module (HSM) is a Trusted Platform Module (TPM).

4. The method of claim 1 wherein said image is initially selected by a user.

5. The method of claim 4, further comprising displaying a selection of images for the user to choose from.

6. The method of claim 5 wherein said at least one of said selection of images is generated by modifying at least one original image to produce a modified image.

7. A computer readable storage medium bearing instructions that when processed by a processor cause the processor to implement a method for displaying an image in a non-client area frame for a display space associated with an operating system, said instructions comprising:

instructions for measuring digital information associated with said operating system, and thereby obtaining a value;

instructions for comparing said value to a previously measured value for the digital information;

instructions for obtaining an image, wherein said image is only accessible if said value matches said previously measured value, wherein obtaining the image indicates that the user interface was authenticated; and instructions for displaying said image in said non-client area frame surrounding a display space for said operating system, wherein displaying the image indicates to the user that the user interface is authenticated.

8. The computer readable storage medium of claim 7 wherein said instructions for obtaining an image comprise instructions for requesting a Hardware Security Module (HSM) to release said image.

9. The computer readable storage medium of claim 8 wherein said Hardware Security Module (HSM) is a Trusted Platform Module (TPM).

10. The computer readable storage medium of claim 7 wherein said image is initially selected by a user.

11. The computer readable storage medium of claim 10, further comprising instructions for displaying a selection of images for the user to choose from.

12. The computer readable storage medium of claim 11 wherein said at least one of said selection of images is generated by modifying at least one original image to produce a modified image.

13. A computer system comprising means for displaying an image in a non-client area frame on a display device associated with an operating system, said means comprising:

means for measuring digital information associated with said operating system, and thereby obtaining a value;

means for comparing said value to a previously measured value for the digital information;

means for obtaining an image, wherein said image is only accessible if said value matches said previously measured value, wherein obtaining the image indicates that the operating system was authenticated; and means for displaying said image in said non-client area frame on said display device to demonstrate that said operating system is trusted.

14. The computer system of claim 13 wherein said means for obtaining an image comprise means for requesting a Hardware Security Module (HSM) to release said image.

15. The computer system of claim 14 wherein said Hardware Security Module (HSM) is a Trusted Platform Module (TPM).

16. The computer system of claim 13 wherein said image is initially selected by a user.

17. The computer system of claim 16, further comprising means for displaying a selection of images for the user to choose from.

18. The computer system of claim 17 wherein said at least one of said selection of images is generated by modifying at least one original image to produce a modified image.

19. The computer system of claim 13 wherein said means for displaying said image on a display device to demonstrate that said operating system is trusted comprises means for placing said image in a non-client area frame for said operating system.

20. The computer system of claim 13 wherein said means for displaying said image on a display device to demonstrate that said operating system is trusted comprises means for placing said image in a user interface frame for an application managed by said operating system.

* * * * *